US011507360B2

(12) United States Patent
Hoyt et al.

(10) Patent No.: US 11,507,360 B2
(45) Date of Patent: Nov. 22, 2022

(54) AUTOMATICALLY OBTAINING SENSOR DATA FOR MACHINE UPDATE

(71) Applicant: Caterpillar Inc., Peoria, IL (US)

(72) Inventors: Daniel W. Hoyt, Brimfield, IL (US); Joshua D. Reed, Galesburg, IL (US); Joshua Ebert, Farmington, IL (US)

(73) Assignee: Caterpillar Inc., Peoria, IL (US)

( * ) Notice: Subject to any disclaimer, the term of this patent is extended or adjusted under 35 U.S.C. 154(b) by 275 days.

(21) Appl. No.: 16/836,477

(22) Filed: Mar. 31, 2020

(65) Prior Publication Data

US 2021/0303289 A1    Sep. 30, 2021

(51) Int. Cl.
| | |
|---|---|
| G06F 8/65 | (2018.01) |
| H04W 4/80 | (2018.01) |
| H04W 4/38 | (2018.01) |
| H04W 24/08 | (2009.01) |
| H04W 4/48 | (2018.01) |
| H04W 84/12 | (2009.01) |
| H04L 101/622 | (2022.01) |
| H04L 61/50 | (2022.01) |

(52) U.S. Cl.
CPC ............... *G06F 8/65* (2013.01); *H04W 4/38* (2018.02); *H04W 4/48* (2018.02); *H04W 4/80* (2018.02); *H04W 24/08* (2013.01); *H04L 61/50* (2022.05); *H04L 2101/622* (2022.05); *H04W 84/12* (2013.01)

(58) Field of Classification Search
CPC ........ G06F 8/60; G06F 8/65–70; H04W 4/38; H04W 4/48; H04W 4/80; H04W 84/12
USPC .................................................. 717/168–173
See application file for complete search history.

(56) References Cited

U.S. PATENT DOCUMENTS

| | | |
|---|---|---|
| 7,111,786 B2 | 9/2006 | Schmidt et al. |
| 8,013,744 B2 | 9/2011 | Tsai et al. |
| 9,558,381 B2 | 1/2017 | Wu et al. |
| | (Continued) | |

FOREIGN PATENT DOCUMENTS

| | | |
|---|---|---|
| EP | 1 614 056 B1 | 3/2011 |
| WO | 2002/031749 A1 | 4/2002 |

OTHER PUBLICATIONS

Daily John, et al., Improving RFID Read Rate in Metallic Tractor-Trailer Applications, IEEE Region 5 Technical Conference, Apr. 20-22, 2007, 5 pages, [retrieved on Jul. 15, 2022], Retrieved from the Internet: <URL:http://ieeexplore.IEEE.org/>.*

(Continued)

*Primary Examiner* — Geoffrey R St Leger
(74) *Attorney, Agent, or Firm* — Harrity & Harrity, LLP

(57) ABSTRACT

A system may comprise: a reader device comprising: one or more memories; and one or more processors communicatively coupled to the one or more memories. The one or more processors may be configured to: obtain, using a wireless local area network communication, sensor data from a plurality of sensor devices associated with a machine; identify, from the sensor data, information identifying a sensor device of the plurality of sensor devices; generate sensor device information that associates the information identifying the sensor device with information identifying a component of the machine; and transmit the sensor device information to cause the machine to be updated using the sensor device information.

20 Claims, 3 Drawing Sheets

(56) References Cited

U.S. PATENT DOCUMENTS

| | | | | |
|---|---|---|---|---|
| 2016/0112216 | A1* | 4/2016 | Sargent | G07C 5/0808 |
| | | | | 370/328 |
| 2016/0371639 | A1 | 12/2016 | Smith et al. | |
| 2017/0099563 | A1* | 4/2017 | Lee | H04W 4/38 |
| 2017/0174236 | A1* | 6/2017 | Worden | H01M 50/449 |
| 2020/0336878 | A1* | 10/2020 | Chieh Tseng | H04W 52/0203 |

OTHER PUBLICATIONS

Jianjun, Zhou, et al., Remote Monitoring and Automatic Navigation System for Agricultural Vehicles Based on WLAN, 4th International Conf. on Wireless Communications, Networking and Mobile Computing, Oct. 12-14, 2008, 4 pages, [retrieved on Jul. 15, 2022], Retrieved from the Internet: <URL:http://ieeexplore.IEEE.org/>.*

Sepehri, Anoush, et al., Condition Monitoring of Industrial Machines Using Cloud Communication, IEEE 9th Annual Information Technology, Electronics and Mobile Communication Conference (IEMCON), Nov. 1-3, 2018, 6 pages, [retrieved on Jul. 15, 2022], Retrieved from the Internet: <URL:http://ieeexplore.IEEE.org/>.*

* cited by examiner

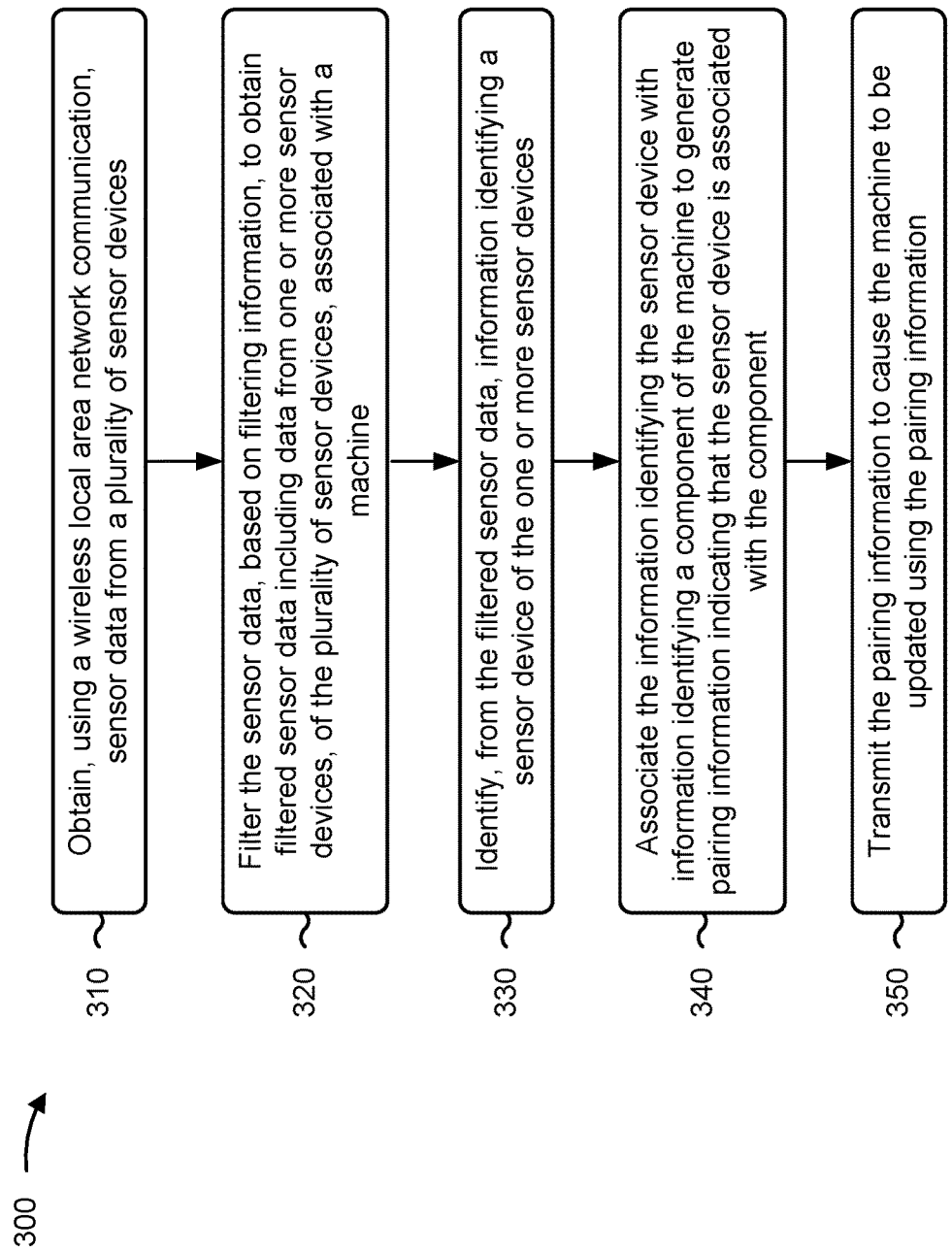

AUTOMATICALLY OBTAINING SENSOR DATA FOR MACHINE UPDATE

TECHNICAL FIELD

The present disclosure relates generally to automatically obtaining sensor data for machine update.

BACKGROUND

Multiple sensor devices may be installed on a machine and may be associated with different components of the machine. When these sensor devices are initially installed on the machine, an on-board computer of the machine needs to be updated with information identifying each sensor device and information identifying a corresponding component of the machine (with which the sensor device is associated). The on-board computer may be updated using various methods.

For example, the on-board computer update may be performed manually. For instance, an operator may manually enter information identifying each sensor device to update the on-board computer. However, such manual update is subject to human error because the operator may enter incomplete information or incorrect information. Additionally, such manual update is also tedious and time consuming. Alternatively, the on-board computer update may be performed based on information obtained by a barcode scanning device. For example, the barcode scanning device may scan information of labels (affixed to the machine) that are associated with the sensor devices. The information of each label may include information identifying a corresponding sensor device. However, such labels may be inaccessible and/or may be damaged. Accordingly, the barcode scanning device may be unable to obtain the information of the labels. Alternatively, the on-board computer update may be performed based on information obtained using a radio-frequency identification (RFID) device. However, the range of an RFID device is limited. Additionally, the sensor devices may require an additional component in order to communicate with the RFID device.

An automatically-activated wireless code symbol reading system is disclosed in U.S. Pat. No. 7,111,786 issued to Metrologic Instruments Inc ("the '786 patent"). The '786 patent discloses that the automatically-activated wireless code symbol reading system comprises a hand-supportable housing having a manually-activatable data transmission switch under automatic communication range dependent control. The '786 patent discloses that when a bar code symbol is read, and the bar code reader is located inside the predetermined RF data communication range of the system, then the symbol character data string is transmitted to the base station over the wireless RF communication link.

While the '786 patent may disclose a wireless code symbol reading system, the '786 patent does not disclose that the wireless code symbol reading system overcomes the problems set forth above.

The process of automatically obtaining sensor data for machine update of the present disclosure solves one or more of the problems set forth above and/or other problems in the art.

SUMMARY

According to some implementations, a method, performed by a device, may comprise: obtaining, using a wireless local area network communication, sensor data from a plurality of sensor devices; filtering the sensor data, based on filtering information, to obtain filtered sensor data, the filtered sensor data including data from one or more sensor devices, of the plurality of sensor devices, associated with a machine; identifying, from the filtered sensor data, information identifying a sensor device of the one or more sensor devices; associating the information identifying the sensor device with information identifying a component of the machine to generate sensor device information, the sensor device information indicating that the sensor device is associated with the component; and transmitting the sensor device information to cause the machine to be updated using the sensor device information.

According to some implementations, a device may comprise: a wireless communication component; and one or more processors configured to: obtain, using the wireless communication component and via a wireless local area network communication, sensor data from a plurality of sensor devices associated with a machine; identify, from the sensor data, first information identifying a first sensor device of the plurality of sensor devices and second information identifying a second sensor device of the plurality of sensor devices; generate sensor device information that: associates the first information with information identifying a first component of the machine, and associates the second information with information identifying a second component of the machine; and transmit the sensor device information to cause a controller of the machine to be updated based on the sensor device information.

According to some implementations, a system may comprise: a reader device comprising: one or more memories; and one or more processors communicatively coupled to the one or more memories. The one or more processors may be configured to: obtain, using a wireless local area network communication, sensor data from a plurality of sensor devices associated with a machine; identify, from the sensor data, information identifying a sensor device of the plurality of sensor devices; generate sensor device information that associates the information identifying the sensor device with information identifying a component of the machine; and transmit the sensor device information to cause the machine to be updated using the sensor device information.

BRIEF DESCRIPTION OF THE DRAWINGS

FIG. 3 is a flow chart of an example process for automatically obtaining sensor data for machine update of FIG. 1.

DETAILED DESCRIPTION

This disclosure relates to a process for automatically obtaining sensor data for machine update. The process for automatically obtaining sensor data for machine update has universal applicability to machines on which sensor devices are installed. The term "machine" may refer to any machine that performs an operation associated with an industry such as, for example, mining, construction, farming, transportation, or another type of industry. Moreover, one or more implements may be connected to the machine.

Figure 1:
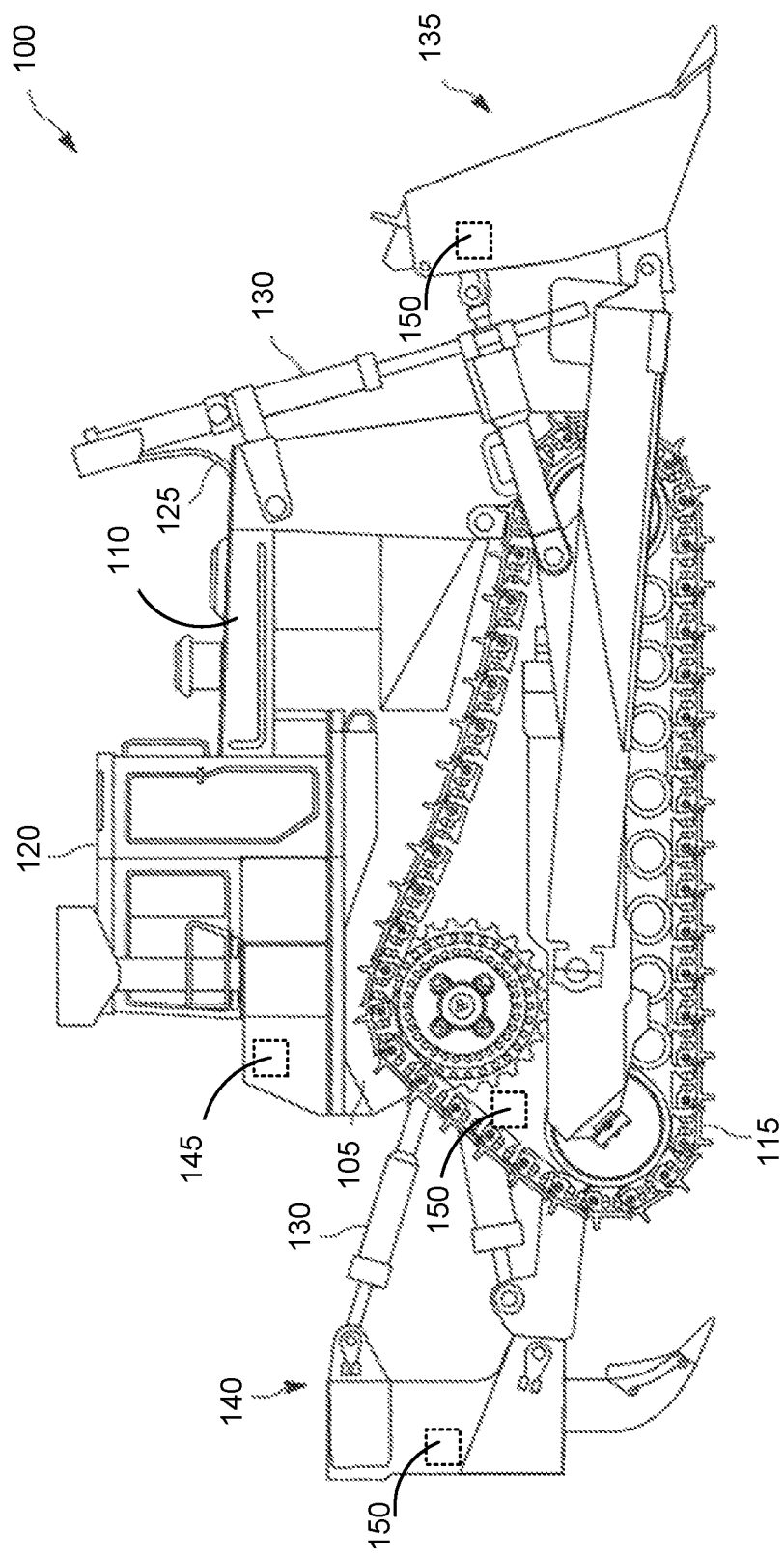
FIG. 1 is diagram of an example machine described herein.

FIG. 1 is a diagram of an example machine 100 described herein. As shown in FIG. 1, the machine 100 is embodied as a track type machine, such as a track type tractor. Alternatively, the machine 100 may be a backhoe loader, a skid steer loader, a wheel loader, a motor grader, an excavator, a scraper, an agricultural tractor, a haul truck, and/or the like.

As shown in FIG. 1, the machine 100 includes a frame assembly 105 and a power source 110. Power source 110 may include one or more batteries, one or more engines (e.g., diesel engines), one or more generators, and/or the like, configured to provide power to machine 100. Machine 100 also includes a set of ground engaging members 115, such as tracks (as shown in FIG. 1), wheels, rollers, and/or the like, for propelling machine 100. As shown in FIG. 1, machine 100 includes an operator cabin 120, which may include one or more input devices (not shown in FIG. 1) for controlling and/or monitoring operations of machine 100, such as one or more push-buttons, control levers, steering wheels, and/or the like.

As shown in FIG. 1, machine 100 includes hoses 125 and hydraulic cylinders 130. In some implementations, machine 100 may include a hydraulic pump (not shown). The hydraulic pump may be operatively coupled to power source 110 to provide pressurized hydraulic fluid, via hoses 125, to hydraulic cylinders 130 for moving tools and implements of the machine 100. As shown in FIG. 1, the implements include a front attachment 135 and/or a rear attachment 140. The front attachment 135 may include a blade assembly, and/or the like. The rear attachment 140 may include a ripper assembly, a winch assembly, a drawbar assembly, and/or the like.

As shown in FIG. 1, machine 100 includes a controller 145, such as, for example, an electronic control module (ECM). Controller 145 may include one or more memories and one or more processors that implement operations associated with updating machine 100, as described below with respect to FIG. 2. As shown in FIG. 1, machine 100 includes sensor devices 150 (referred to herein individually as "sensor device 150," and collectively as "sensor devices 150"). Sensor devices 150 may be associated with different components of machine 100. As shown in FIG. 1, sensor devices 150 are associated with ground engaging members 115, front attachment 135, and rear attachment 140. For example, sensor devices 150 may be installed on machine 100 to monitor the different components of machine 100. Sensor device 150 may transmit sensor data that is used to update machine 100 (e.g., update controller 145 of machine 100), as described below with respect to FIGS. 2 and 3.

As indicated above, FIG. 1 is provided as an example. Other examples may differ from what was described in connection with FIG. 1.

Figure 2:
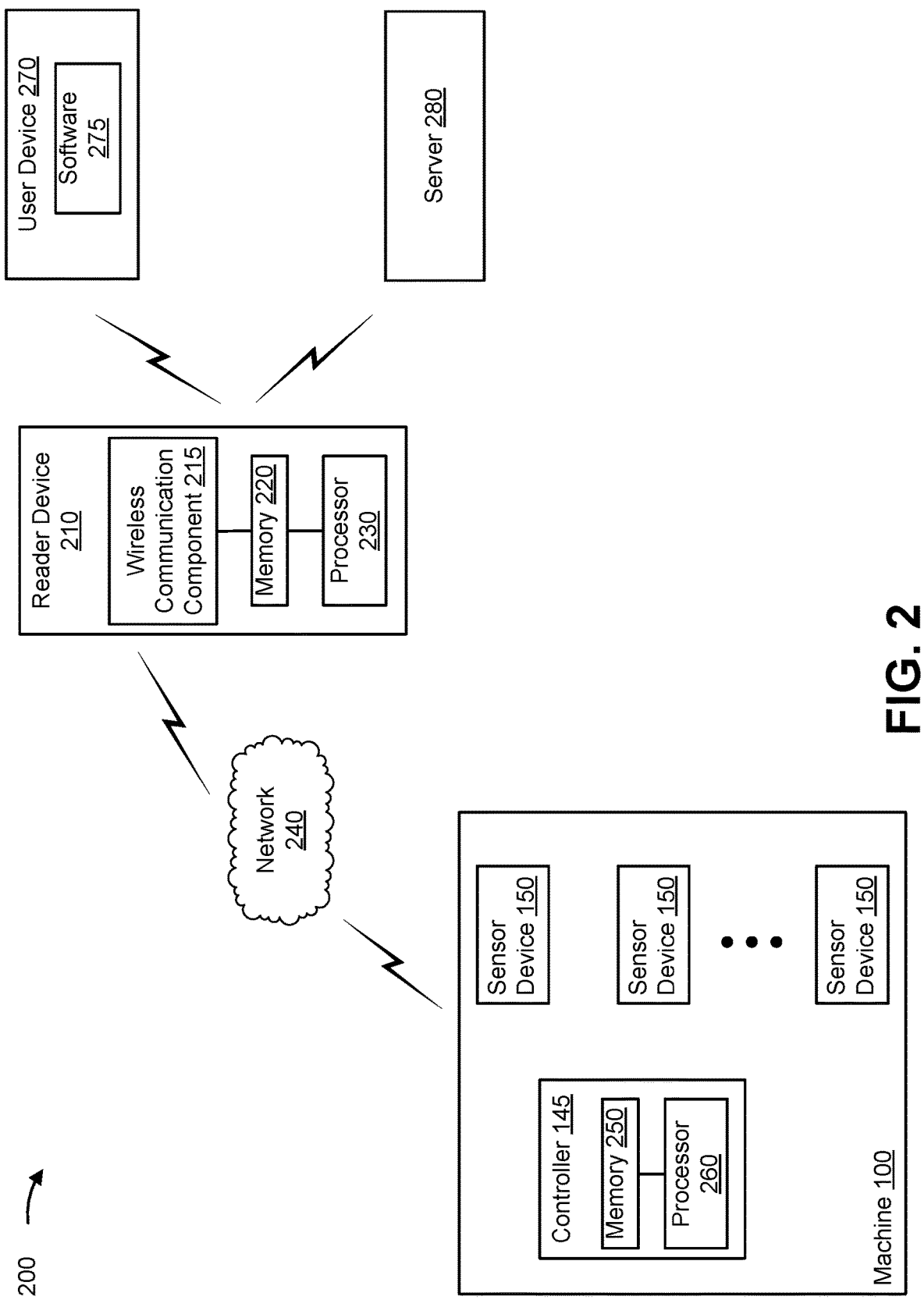
FIG. 2 is a diagram of an example system, described herein, that may be implemented in association with the machine of FIG. 1.

FIG. 2 is a diagram of an example system, described herein, that may be implemented in association with the machine of FIG. 1. As shown in FIG. 2, system 200 of FIG. 2 includes reader device 210, network 240, machine 100, user device 270, and server 280. Reader device 210, machine 100, user device 270, and server 280 may connect via wired connections, wireless connections, or a combination of wired and wireless connections.

Reader device 210 may include one or more devices, components, and/or elements capable of receiving, storing, and processing sensor data of sensor devices associated with a machine and capable of generating, storing, processing, and/or providing sensor device information. When reader device 210 processes sensor data, reader device 210 may filter the sensor data to obtain filtered sensor data for one or more particular sensor devices (or one or more targeted sensor devices). Sensor device information may include information indicating that one or more sensor devices 150 are associated with one or more respective components of machine 100.

As shown in FIG. 2, reader device 210 includes a wireless communication component 215, one or more memories 220 (referred to herein individually as "memory 220," and collectively as "memories 220"), and one or more processors 230 (referred to herein individually as "processor 230," and collectively as "processors 230"). Wireless communication component 215 includes a transceiver, a separate transmitter and receiver, an antenna, and/or the like. For example, wireless communication component 215 may include a Bluetooth transceiver or another type of wireless local area network transceiver. In some implementations, wireless communication component 215 may obtain sensor data from one or more sensor devices 150, and may transmit sensor device information to update machine 100, as described herein.

Memory 220 includes a random-access memory (RAM), a read only memory (ROM), and/or another type of dynamic or static storage device (e.g., a flash memory, a magnetic memory, and/or an optical memory) that stores information and/or instructions for use by processor 230 (e.g., sensor data obtained from sensor devices 150). Processor 230 is implemented in hardware, firmware, and/or a combination of hardware and software. Processor 230 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 230 may include one or more processors capable of being programmed to perform a function.

Network 240 includes one or more wired and/or wireless networks. For example, network 240 may include a local area network (LAN). For instance, network 240 may include a wireless LAN that enables Bluetooth communication between reader device 210 and sensor devices 150. Additionally, or alternatively, network 240 may include a cellular network (e.g., a long-term evolution (LTE) network, a code division multiple access (CDMA) network, a 3G network, a 4G network, a 5G network, or another type of cellular network), a public land mobile network (PLMN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Machine 100 includes controller 145 and one or more sensor devices 150. Controller 145 includes one or more memories 250 (referred to herein individually as "memory 250," and collectively as "memories 250") and one or more processors 260 (referred to herein individually as "processor 260," and collectively as "processors 260"). Memories 250 and processors 260 may be similar to memories 220 and processors 230, as described above. Sensor device 150 includes one or more devices that are capable of receiving, generating, storing, processing, and/or providing sensor data. Sensor data may include sensor specific information regarding sensor device 150 and component specific information regarding a component of machine 100 associated with sensor device 150.

Sensor specific information may include information identifying sensor device 150, such as, for example, a media access control (MAC) address of sensor device 150, an identifier of sensor device 150, and/or the like. Sensor specific information may also, or alternatively, include information identifying a type of sensor device 150, information identifying a signal strength of sensor device 150, information identifying a voltage level of sensor device 150, information identifying wear (or an age) of sensor device 150, information identifying a power level of sensor device 150, information identifying a make and/or model of sensor device 150, information identifying an operating system and/or an operating system version of sensor device 150, and/or the like. The sensor specific information identified above are simply examples of types of sensor specific information that might be included in the sensor data.

Component specific information may include information identifying wear (or an age) of the component, information identifying usage (e.g., type, amount, etc.) of the component, information regarding performance of the component, information identifying a brand of the component, and/or the like. The component specific information identified above are simply examples of types of component specific information that might be included in the sensor data.

Sensor device 150 may include a wireless communication component (not shown), which may be similar to wireless communication component 215, as described above. The wireless communication component, of sensor device 150, may include a Bluetooth transceiver or another type of wireless local area network transceiver. For example, sensor device 150 may use the wireless communication component for Bluetooth communication with reader device 210. For instance, sensor device 150 may transmit sensor data to reader device 210 as part of a local area wireless communication with reader device 210.

User device 270 includes a device that is capable of updating machine 100. For example, user device 270 may include a desktop, a laptop, a tablet, a mobile phone, another type of mobile device, and/or the like. As described herein, user device 270 may receive sensor device information from reader device 210 and use the sensor device information to update machine 100. Reader device 210 may transmit sensor device information to user device 270 to cause or permit user device 270 to update machine 100.

User device 270 may execute software 275 to update machine 100 (e.g., update controller 145 of machine 100) based on the sensor device information. For instance, user device 270 may receive the sensor device information as input to software 275 and generate a user interface (e.g., a graphical user interface) based on the sensor device information. As an example, the user interface may include information identifying one or more sensor devices 150 and information identifying one or more components of machine 100 with which the one or more sensor devices 150 are associated. The user interface may indicate that the one or more sensor devices 150 are associated with the one or more components of machine 100. User device 270 may cause machine 100 to be updated by causing the sensor device information to be stored in one or more memories 250 of controller 145.

Server 280 is a device that is capable of processing component specific information. For example, server 280 may include a command and control center server, a central server, a back office server, and/or the like. Server 280 may receive, store, and process component specific information included in sensor data of one or more sensor devices 150. In some implementations, user device 270 may receive the component specific information from reader device 210 and provide the component specific information to server 280. Server 280 may perform analytics functions based on processing the component specific information and provide information (including a result of the analytics functions) to one or more devices of one or more operators (e.g., user device 270). For example, server 280 may determine, based on monitoring the component, whether the component is to be serviced, whether the component is to be replaced, and/or the like. Server 280 may then communicate information regarding such determination to the one or more devices.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of environment system 200. For example, reader device 210 may be integrated with user device 270 (e.g., by direct connection with user device 270, by wired connection with user device 270, by being implemented within a same housing as user device 270, and/or the like). Accordingly, the combination of reader device 210 and user device 270 may perform a portion or all of the process described below with respect to FIG. 3.

FIG. 3 is example process 300 for automatically obtaining sensor data for machine update of the machine of FIG. 1. One or more process blocks of FIG. 3 may be performed by reader device 210. Additionally, or alternatively, one or more process blocks of FIG. 3 may be performed by another device or a group of devices separate from or including reader device 210, such as controller 145, sensor devices 150, user device 270, and/or server 280.

As shown in FIG. 3, process 300 may include obtaining, using a wireless local area network communication, sensor data from a plurality of sensor devices (block 310). For example, reader device 210 (e.g., using wireless communication component 215, memory 220, processor 230, and/or the like) may obtain, via Bluetooth communication (e.g., over network 240), sensor data (described above) from sensor devices 150. For instance, sensor devices 150 may broadcast sensor data via Bluetooth channels (or Bluetooth advertisement channels) and reader device 210 may receive the sensor data from sensor device 150 via the Bluetooth channels. As an example, sensor devices 150 may broadcast sensor data as Bluetooth advertisements via Bluetooth channels. A Bluetooth channel includes a wireless channel that is reserved for a device to broadcast via Bluetooth without having to establish a connection with another device.

As further shown in FIG. 3, process 300 may include filtering the sensor data, based on filtering information, to obtain filtered sensor data, the filtered sensor data including data from one or more sensor devices, of the plurality of sensor devices, associated with a machine (block 320). For example, reader device 210 (e.g., using wireless communication component 215, memory 220, processor 230, and/or the like) may filter the sensor data (obtained from the sensor devices 150), based on filtering information, to obtain filtered sensor data. The filtered sensor data may include data from one or more sensor devices, of the plurality of sensor devices, associated with a machine.

Reader device 210 may be programmed (or configured) to obtain sensor data from one or more sensor devices 150 associated with machine 100 and discard sensor data from sensor devices 150 associated with other machines and/or devices. In this regard, reader device 210 may obtain sensor data from one or more sensor devices 150 that are associated with machine 100 and from one or more sensor devices that are associated with other machines and/or devices. Accordingly, reader device 210 may filter, based on filtering information, such sensor data to obtain filtered sensor data from the one or more sensor devices 150 that are associated with machine 100. For example, reader device 210 may accept sensor data from the one or more sensor devices 150 (associated with machine 100) and may reject sensor data from one or more other sensor devices 150 of the plurality of sensor devices 150. The filtering information may include information identifying a type of sensor device, information identifying a signal strength or a range of signal strengths of sensor devices, and/or the like. The filtered sensor data may include information that matches the filtering information.

As further shown in FIG. 3, process 300 may include identifying, from the filtered sensor data, information identifying a sensor device of the one or more sensor devices (block 330). For example, reader device 210 (e.g., using wireless communication component 215, memory 220, processor 230, and/or the like) may identify, from the filtered sensor data, information identifying a sensor device 150 of the one or more sensor devices 150. For example, reader device 210 may parse the filtered sensor data to identify information identifying the sensor device 150, such as, for example, a MAC address of the sensor device 150, an identifier of the sensor device 150, and/or the like. In some implementations, the sensor device 150 may be included in a subset of sensor devices 150, from the plurality of sensor devices 150, whose sensor data matches the filtering information. As used herein, the subset of sensor devices 150 may include a single sensor device 150 associated with machine 100, multiple (but not all) sensor devices 150 associated with machine 100, or all sensor devices 150 associated with machine 100.

As further shown in FIG. 3, process 300 may include associating the information identifying the sensor device with information identifying a component of the machine to generate sensor device information, the sensor device information indicating that the sensor device is associated with the component (block 340). As explained in more detail below, the filtering information may include information identifying a type of sensor device. The information identifying the type of sensor device may identify a component (or a type of component) of machine 100 (e.g., ground engaging members 115, front attachment 135, or rear attachment 140) with which the sensor device 150 may be associated.

In this regard, reader device 210 (e.g., using wireless communication component 215, memory 220, processor 230, and/or the like) may determine that the sensor device 150 is associated with the component based on the information identifying the sensor device 150 being included in the filtered sensor data. Accordingly, reader device 210 (e.g., using wireless communication component 215, memory 220, processor 230, and/or the like) may associate the information identifying the sensor device 250 with information identifying the component of machine 100 to generate sensor device information. The sensor device information may indicate that the sensor device 250 is associated with the component.

As further shown in FIG. 3, process 300 may include transmitting the sensor device information to cause the machine to be updated using the sensor device information (block 350). For example, reader device 210 (e.g., using wireless communication component 215, memory 220, processor 230, and/or the like) may transmit the sensor device information to cause machine 100 to be updated using the sensor device information. As an example, reader device 210 may transmit sensor device information to cause one or more parameters of machine 100, one or more operations of machine 100, and/or one or more configurations of machine 100 to be updated using sensor device information. For instance, reader device 210 may transmit the sensor device information to user device 270 to cause user device 270 to update machine 100 (or controller 145 of machine 100) using the sensor device information, as explained in more detail below.

Process 300 may include additional implementations, such as any single implementation or any combination of implementations described above, below, and/or in connection with one or more other processes described elsewhere herein.

In some examples, reader device 210 includes a Bluetooth device and the plurality of sensor devices 150 (including the sensor device 150) includes a plurality of Bluetooth sensor devices. Additionally, the information identifying the sensor device 150 includes a MAC address of the sensor device 150.

Reader device 210 may receive the filtering information from user device 270. In some implementations, reader device 210 may be preprogrammed with the filtering information. For example, the filtering information may be stored in a memory 220 of reader device 210, prior to reader device 210 communicating with user device 270. When transmitting the sensor device information, reader device 210 may transmit the sensor device information to the user device 270 to cause the user device 270 to update controller 145 of machine 100 based on the sensor device information. For example, user device 270 may update controller 145 of machine 100, in response to receiving the sensor device information from reader device 210 (e.g., based on an instruction from reader device 210 and/or based on code of software 275). For instance, when transmitting the sensor device information, reader device 210 may transmit the sensor device information to user device 270 to permit user device 270 to update the machine using the sensor device information.

In some examples, the filtering information may include information identifying one or more types of sensor devices. The sensor data may include, for the sensor device 150, information identifying a type of the sensor device 150. Reader device 210, when filtering the sensor data, may filter the sensor data based on the information identifying the one or more types of sensor devices. For example, reader device 210 may determine that the information identifying the type of the sensor device 150 matches information included in the information identifying the one or more types of sensor devices. Reader device 210 may, therefore, identify the information identifying the sensor device 150 based on determining that the information identifying the type of the sensor device 150 matches the information included in the information identifying the one or more types of sensor devices.

In some examples, the filtering information may include information identifying a signal strength. The sensor data may include, for the sensor device, information identifying a signal strength of the sensor device 150. Reader device 210, when filtering the sensor data, may filter the sensor data based on the information identifying the signal strength. For example, reader device 210 may determine that the information identifying the signal strength of the sensor device 150 matches information included in the information identifying the signal strength.

Reader device 210 may, therefore, identify the information identifying the sensor device 150 based on determining that the information identifying the signal strength of the sensor device 150 matches the information included in the information identifying the signal strength. In some examples, reader device 210 may filter the sensor data based on the information identifying the signal strength, after filtering the sensor data based on the information identifying the one or more types of sensor devices.

Reader device 210 may determine a location of the component on the machine based on the information identifying the signal strength of the sensor device. For example, reader device 210 may determine that the component is located on a particular side of machine 100 (e.g., a front side, a rear side, a left side, or a right side) based on reader device location information. In some implementations, the reader device location information may be received from user device 270. Additionally, or alternatively, reader device 210 may generate the reader device location information based on information from one or more local positioning systems.

Reader device 210 may then determine whether the signal strength of the sensor device 150 satisfies a signal strength threshold when reader device 210 is located on the particular side. Reader device 210 may determine that the sensor device 150 is located on the particular side when the signal strength of the sensor device 150 satisfies the signal strength threshold. Alternatively, reader device 210 may determine whether the signal strength of the sensor device 150 is within a range of signal strengths when reader device 210 is located on the particular side. Reader device 210 may determine that the sensor device 150 is located on the particular side when the signal strength of the sensor device 150 is within a range of signal strengths.

Reader device 210 may determine the location of the component (e.g., as being located on the particular side) based on the sensor device 150 being located on the particular side and based on the sensor device 150 being associated with the component. Reader device 210, when associating the information identifying the sensor device with the information identifying the component, may associate the information identifying the sensor device with the information identifying the component of the machine and with information identifying the location of the component to generate the sensor device information.

Reader device 210, when transmitting the sensor device information, may transmit, to user device 270, the sensor device information as input to software 275 used by user device 270 to configure machine 100. For example, reader device 210 may wirelessly transmit the sensor device information to user device 270. Accordingly, user device 270 may configure machine 100 (e.g., update controller 145) using software 275, with the sensor device information as input to software 275. For example, user device 270 may update one or more parameters of machine 100, one or more operations of machine 100, and/or one or more configurations of machine 100 using sensor device information.

Reader device 210 may identify one or more other sensor devices 150 (e.g., another sensor device 150) and determine that the other sensor device 150 is associated with one or more other components of machine 100 (e.g., another component), in a manner similar to the manner described above. Reader device 210 may subsequently generate sensor device information that further associates information identifying the other sensor device 150 with information identifying the other component, in a manner similar to the manner described above.

In some examples, the information identifying the sensor device 150 includes a MAC address of the sensor device 150 and the information identifying the other sensor device 150 includes a MAC address of the other device 150.

Reader device 210, when identifying the information identifying the sensor device 150, may determine, based on a type of the sensor device, a format of sensor data obtained from the sensor device 150; and determine, based on the format, different types of information included in different portions of the sensor data (as explained above) obtained from the sensor device 150. Reader device 210 may identify the information identifying the sensor device 150 from a portion, of the different portions, that includes identification information of sensor devices of a type of the sensor device 150.

Reader device 210, when transmitting the sensor device information, may transmit a first portion of the sensor device information to the user device 270 to cause the user device 270 to display information indicating that the sensor device 150 is associated with the component; and transmit a second portion of the sensor device information to another user device 270 to cause the other user device 270 to display information indicating that the other sensor device 150 (mentioned above) is associated with the other component (mentioned above).

Reader device 210 may generate labeling information based on the sensor device information. The labeling information may include at least one of: textual information indicating that the sensor device 150 is associated with the component, a barcode indicating that the sensor device 150 is associated with the component, or a data matrix code (or matrix code) indicating that the sensor device 150 is associated with the component. The data matrix code may include a Quick Response (QR) code.

Reader device 210 may obtain information identifying a type of sensor device. For example, reader device 210 may receive the information identifying the type of sensor device from user device 270. Additionally, or alternatively, reader device 210 may preprogrammed with the information identifying the type of sensor device and may obtain the information identifying the type of sensor device from a memory 220 of reader device 210. The information identifying the type of sensor device may include the information identifying the component. The sensor data may include, for the sensor device 150, information identifying a type of the sensor device 150.

In some implementations, the information identifying the type of sensor device (e.g., included in the filtering information) may include the information identifying the component. For example, the information identifying the type of sensor device may identify a component (or a type of component) of machine 100 with which the sensor device 150 may be associated. For instance, the information identifying the type of sensor device may include information identifying a ground engaging member sensor device which may be a type of sensor device associated with one or more ground engaging members of a machine.

More particularly, the information identifying the type of sensor device may include information identifying a track sensor device (e.g., a specific type of ground engaging member) which may be a type of sensor device associated with one or more tracks of a machine. Additionally, or alternatively, the information identifying the type of sensor device may include information identifying a work tool sensor device which may be a type of sensor device associated with one or more work tools or attachments installed on a machine. In some instances, the information identifying the work tool sensor device may identify a specific work tool or attachment.

Reader device 210 may determine that the information identifying the type of the sensor device 150 matches information included in the information identifying the type of sensor device. Reader device 210 may further determine that the sensor device 150 is associated with the component based on determining that the information identifying the type of the sensor device 150 matches information included in the information identifying the type of sensor device. Reader device 210, when generating the sensor device information, may generate the sensor device information based on determining that the sensor device 150 is associated with the component.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed process for automatically obtaining sensor data for machine update has universal applicability to machines on which sensor devices are installed. The disclosed process for automatically obtaining sensor data for machine update includes using a reader device (e.g., reader device 210) to obtain sensor data (e.g., via Bluetooth communication) from one or more sensor devices (e.g., sensor devices 150) associated with a machine (e.g., machine 100). The disclosed process further includes processing the sensor data to generate sensor device information and transmitting the sensor device information (e.g., to user device 270) to cause the machine to be updated based on the sensor device information. The sensor device information includes information indicating that the one or more sensor devices are associated with one or more components of the machine.

Several advantages may be associated with the disclosed process for automatically obtaining sensor data for machine update. For example, the use of the disclosed process may decrease or eliminate the inaccuracy of manually updating a machine with information identifying a sensor device installed on the machine and associated with a component of the machine. Accordingly, the disclosed process may improve operation of the machine (e.g., operation of the component) based on the machine being updated with the accurate information regarding the sensor device (associated with the component). Additionally, the use of the disclosed process of automatically obtaining sensor data for machine update may expedite the process of machine update with sensor data and, therefore, preserve scanner resources utilized when scanning labels (for sensor devices) that are damaged, unreadable, or inaccessible. Accordingly, the disclosed process of automatically obtaining sensor data for machine update improves efficiency in performing such machine update.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

What is claimed is:

1. A method performed by a device, the method comprising:
obtaining, using a wireless local area network communication, sensor data from a plurality of sensor devices;
filtering the sensor data, based on filtering information, to obtain filtered sensor data,
the filtering information including at least one of information identifying one or more types of sensor devices, information identifying a signal strength, or information identifying a range of signal strengths, and
the filtered sensor data including data from one or more sensor devices, of the plurality of sensor devices, associated with a machine;
identifying, from the filtered sensor data, information identifying a sensor device of the one or more sensor devices;
associating the information identifying the sensor device with information identifying a component of the machine to generate sensor device information,
the sensor device information indicating that the sensor device is associated with the component; and
transmitting the sensor device information to cause the machine to be updated using the sensor device information.

2. The method of claim 1, wherein the device includes a Bluetooth device,
wherein the plurality of sensor devices includes a plurality of Bluetooth sensor devices, and
wherein the information identifying the sensor device includes a media access control address of the sensor device.

3. The method of claim 1, further comprising:
receiving the filtering information from a user device,
wherein transmitting the sensor device information includes:
transmitting the sensor device information to the user device to cause the user device to update a controller of the machine based on the sensor device information.

4. The method of claim 1,
wherein the sensor data includes, for the sensor device, information identifying a type of the sensor device,
wherein filtering the sensor data comprises filtering the sensor data based on the filtering information identifying the one or more types of sensor devices, and
wherein the information identifying the type of the sensor device matches information included in the filtering information identifying the one or more types of sensor devices.

5. The method of claim 1,
wherein the sensor data includes, for the sensor device, information identifying a particular signal strength of the sensor device,
wherein filtering the sensor data comprises filtering the sensor data based on the filtering information identifying the signal strength, and
wherein the information identifying the particular signal strength of the sensor device matches information included in the filtering information identifying the signal strength.

6. The method of claim 5, further comprising:
determining a location of the component on the machine based on the filtering information identifying the signal strength of the sensor device,
wherein associating the information identifying the sensor device with the information identifying the component of the machine comprises:

associating the information identifying the sensor device with the information identifying the component of the machine and with information identifying the location of the component to generate the sensor device information.

7. The method of claim 1, wherein transmitting the sensor device information includes:
wirelessly transmitting, to a user device, the sensor device information as input to software used by the user device to configure the machine.

8. A device, comprising:
a wireless communication component; and
one or more processors configured to:
obtain, using the wireless communication component and via a wireless local area network communication, sensor data from a plurality of sensor devices associated with a machine;
filter the sensor data, based on filtering information, to obtain filtered sensor data,
the filtering information including at least one of information identifying one or more types of sensor devices, information identifying a signal strength, or information identifying a range of signal strengths;
identify, from the filtered sensor data, first information identifying a first sensor device of the plurality of sensor devices and second information identifying a second sensor device of the plurality of sensor devices;
generate sensor device information that:
associates the first information with information identifying a first component of the machine, and
associates the second information with information identifying a second component of the machine; and
transmit the sensor device information to cause a controller of the machine to be updated based on the sensor device information.

9. The device of claim 8, wherein the first information includes a media access control address of the first sensor device, and
wherein the second information includes a media access control address of the second sensor device.

10. The device of claim 8, wherein the sensor data includes information identifying a respective type of each sensor device of the plurality of sensor devices, and
wherein, when filtering the sensor data, the one or more processors are configured to:
obtain the information identifying the one or more types of sensor devices; and
filter the sensor data based on the information identifying the one or more types of sensor devices, prior to identifying the first information and the second information.

11. The device of claim 10, wherein the sensor data includes information identifying a respective signal strength of each sensor device of the plurality of sensor devices, and
wherein, when filtering the sensor data, the one or more processors are further configured to:
obtain the information identifying the signal strength; and
filter the sensor data based on the information identifying the signal strength after filtering the sensor data based on the information identifying the one or more types of sensor devices, prior to identifying the first information and the second information.

12. The device of claim 8, wherein the one or more processors, when identifying the first information, are configured to:
determine, based on a type of the first sensor device, a format of sensor data obtained from the first sensor device;
determine, based on the format, different types of information included in different portions of the sensor data obtained from the first sensor device; and
identify the first information from a portion, of the different portions, that includes identification information of sensor devices of the type of the first sensor device.

13. The device of claim 8, wherein the one or more processors, when transmitting the sensor device information, are configured to:
transmit a first portion of the sensor device information to a first user device to cause the first user device to display information indicating that the first sensor device is associated with the first component; and
transmit a second portion of the sensor device information to a second user device to cause the second user device to display information indicating that the second sensor device is associated with the second component.

14. The device of claim 8, wherein the one or more processors, when transmitting the sensor device information, are configured to:
transmit the sensor device information to a user device to cause the user device to store the sensor device information in one or more memories associated with the controller of the machine.

15. The device of claim 8, wherein the one or more processors are further configured to:
generate labeling information based on the sensor device information,
wherein the labeling information includes at least one of:
textual information indicating that the first sensor device is associated with the first component,
a barcode indicating that the first sensor device is associated with the first component, or
a data matrix code indicating that the first sensor device is associated with the first component.

16. A system, comprising:
a reader device comprising:
one or more memories; and
one or more processors, communicatively coupled to the one or more memories, configured to:
obtain, using a wireless local area network communication, sensor data from a plurality of sensor devices associated with a machine;
filter the sensor data, based on filtering information, to obtain filtered sensor data,
the filtering information including at least one of information identifying one or more types of sensor devices, information identifying a signal strength, or information identifying a range of signal strengths;
identify, from the filtered sensor data, information identifying a sensor device of the plurality of sensor devices;
generate sensor device information that associates the information identifying the sensor device with information identifying a component of the machine; and
transmit the sensor device information to cause the machine to be updated using the sensor device information.

17. The system of claim 16, wherein the one or more processors, when transmitting the sensor device information, are configured to:
- wirelessly transmit, to a user device, the sensor device information as input to software used by the user device to configure the machine.

18. The system of claim 16, wherein the sensor data includes information identifying a signal strength of the sensor device, and
- wherein, when filtering the sensor data, the one or more processors are further configured to:
  - obtain the filtering information identifying the range of signal strengths; and
  - filter the sensor data based on the filtering information identifying the range of signal strengths,
- wherein the sensor device is included in a subset of the plurality of sensor devices, and
- wherein the information identifying the signal strength of the sensor device matches the filtering information identifying the range of signal strengths.

19. The system of claim 16, wherein the reader device includes a Bluetooth device, and
- wherein the plurality of sensor devices includes a plurality of Bluetooth sensor devices.

20. The system of claim 16, wherein the one or more processors are further configured to:
- obtain filtering information identifying a type of sensor device,
  - wherein the filtering information identifying the type of sensor device includes the information identifying the component, and
  - wherein the sensor data includes, for the sensor device, information identifying a type of the sensor device,
- determine that the information identifying the type of the sensor device matches information included in the filtering information identifying the type of sensor device, and
- determine that the sensor device is associated with the component based on determining that the information identifying the type of the sensor device matches information included in the filtering information identifying the type of sensor device, and
- wherein the one or more processors, when generating the sensor device information, are configured to generate the sensor device information based on determining that the sensor device is associated with the component.

* * * * *